Jan. 18, 1938.    A. F. REHNBERG    2,105,929
ROLLER FEED MECHANISM FOR ROLLER BEARING ASSEMBLING MACHINES.
Original Filed Dec. 16, 1933
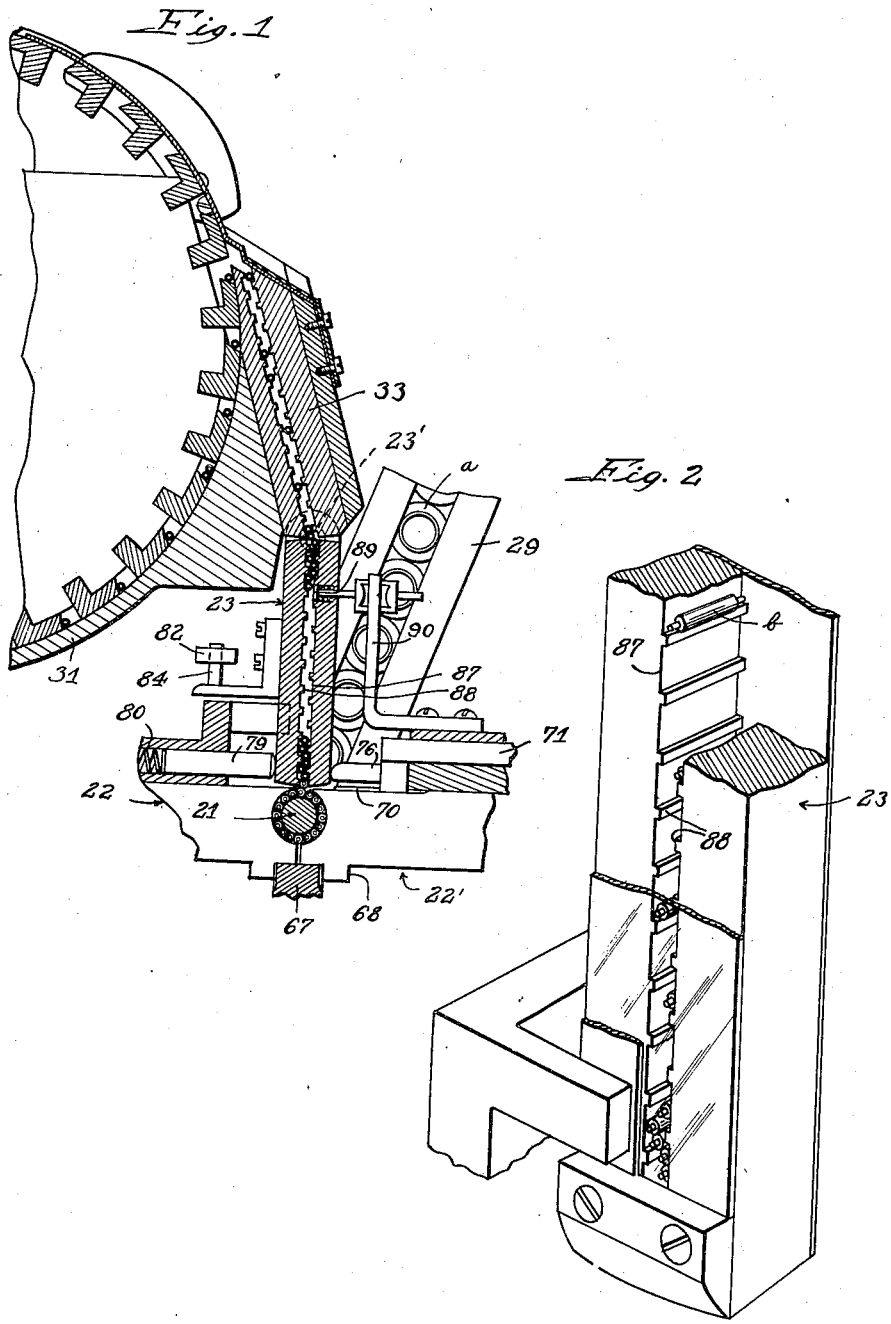
Inventor:
Axel F. Rehnberg
By
Wilson, Bowell, McCanna & Wintercorn
Attys.

Patented Jan. 18, 1938

2,105,929

UNITED STATES PATENT OFFICE 2,105,929

ROLLER FEED MECHANISM FOR ROLLER BEARING ASSEMBLING MACHINES

Axel F. Rehnberg, Rockford, Ill., assignor, by mesne assignments, to Borg-Warner Corporation, Chicago, Ill., a corporation of Illinois Original application December 16, 1933, Serial No. 702,683. Divided and this application January 11, 1936, Serial No. 58,680

9 Claims. (Cl. 193—27)

This is a division of my application Serial No. 702,683, filed December 16, 1933, which matured into Patent No. 2,057,692.

The principal object of the present invention is to provide an improved roller feed mechanism for feeding rollers or other like articles from a hopper to an assembling chamber, and keep the rollers always in substantially parallel relation to one another throughout their passage from the hopper to the assembling chamber, whereby to insure delivery of the rollers into the assembling chamber in the proper relationship and also avoid any danger of rollers becoming lodged at some point and interfering with the proper functioning of the machine.

The feed mechanism, in accordance with my invention, includes a roller chute having therein a zigzag passage for the rollers to run through, the rollers being continuously supplied to the chute at the upper end from the hopper, and being arranged to move downwardly by gravity through the chute. In certain machines, as in the one herein disclosed, a second chute with a similar zigzag passage therein is mounted for oscillation with respect to the lower end of the first chute for the three-fold purpose of (a) permitting lateral vibration of the chute to expedite movement of rollers through the passage by gravity when they are being delivered to a bearing; (b) permitting swinging movement of the chute from a discharge position to an out-of-the-way position closing off the outlet end of the passage, and (c) permitting opening or closing of the passage in the chute by means of a gate relative to which the chute is oscillated, the gate closing the passage near the upper end so that only a predetermined number of rollers are in the passage therebelow to be discharged by gravity to the bearing in the vibration of the chute, and the gate being open when the chute is moved to its out-of-the-way position so that the entire passage may again be filled with rollers.

The invention is hereinafter described in detail by reference to the accompanying drawing, in which—

Figure 1 is a vertical section through a portion of a roller bearing assembling machine showing the improved roller feed mechanism of my invention, and Fig. 2 is a perspective view of the oscillating chute with parts broken away and appearing in section to better illustrate the construction and mode of operation.

The same reference numerals are applied to corresponding parts in these views.

Before proceeding with the description of this invention, it should be understood that the roller feed mechanism of my invention, while specially designed and adapted for use on a roller bearing assembling machine for delivering rollers from a hopper to the assembling mechanism for assembly in bearing blocks for trunnion type universal joints, is not to be regarded as limited to that application. In other words, the roller feed mechanism of this invention is adapted for use in the handling of rollers, pins, needles, and in fact any articles generally similar in form to the bearing rollers *b* appearing in Figs. 1 and 2, and it should also be understood that the mechanism may be enlarged or diminished in size to accommodate larger or smaller sized articles.

The roller bearing assembling machine is, of course, fully illustrated and described in the parent application. Fig. 1 shows enough of the machine for the present purposes, to wit: the pilot plunger designated generally by the numeral 21 on which the lowest one of the retainer rings *a* in chute 29 is received and around which the rollers *b* are grouped in front of the aforesaid ring and between the jaws 22—22', preliminary to the transfer of the rollers and ring into a bearing block. 67 is a cam which cooperates with lugs 68 on the jaws to hold the jaws apart sufficiently to admit the rollers discharged from the oscillating roller feed chute 23, the cam 67 being arranged to move to a retracted position to allow the jaws to close after the annular zone around the plunger 21 is filled. A finger 70 is slidable over the jaws to close the small gap left between the jaws at the top when the cam 67 is retracted, so that there is no opportunity for one of the rollers to jump out in the closing of the jaws. The finger 70 is operable by means of a slide 71 in timed relation to the operation of cam 67. When the jaws are closed and the finger 70 covers the gap, a slide 76 engages the lower end of the chute 23 and moves it to the left to an inoperative out-of-the-way position. The chute 23 which with its companion chute 33 forms the principal subject matter of the present invention is pivoted at its upper end, as indicated at 23', just below the inclined stationary chute 33. Vibration or oscillation of the chute is secured by a spring-pressed plunger 79 tending to move the chute in one direction under action of the spring 80, and an arm 82 of a bell crank lever which is given impulse through a suitable mechanism to move the chute in the opposite direction through pivotal connection therewith at 84. The front wall of the chute 23 is of celluloid or other transparent material, as illustrated in Fig. 2, so that the operator can see into the passage 87 to observe whether rollers are feeding through properly.

In accordance with the present invention, the chute 23 and its companion chute 33 have their longitudinal passages 87 slightly wider than the rollers b to be fed therethrough, so that the rollers will feed through easily, and there are slight transverse ridge projections 88 on opposite walls of the passage in staggered relationship and properly spaced lengthwise of the passage to allow the rollers to feed through in a zigzag course in the vibration or oscillation of the chute, as indicated in Fig. 2. In this way the rollers are not free to tumble, in hit or miss fashion through the chutes, but are caused to assume approximate parallelism by reason of contact with one after another of the projections 88 first on one side and then on the other side of the passage. There is, therefore, no likelihood of rollers becoming lodged at some point in the chute itself or at the point of discharge of rollers in between the jaws 22—22' and around the pilot plunger 21. There is sufficient pitch to the passage in the chute 33 for the rollers to pass down freely by gravity alone. The vibration of the chute 23 positively eliminates any danger of the roller feed being interrupted by one or more rollers coming through too slowly and hindering the travel of rollers behind them. The feed is in fact so good that I have found it desirable although not essential to shut off the passage near the upper end of the chute 23 with a gate 89 carried loosely on a bracket 90. This gate is simply in the form of a plunger spring-pressed toward closed position, and it serves to hold back the column of rollers in chute 33 so as to allow only those rollers below the gate in the chute 23 to be fed down into the jaws 22—22'. The gate is located so that there will be certainly more than enough rollers present in the passage 87 below the gate 89 to fill the space between the jaws. By cutting off the column of rollers above the number being vibrated in the chute 23, I eliminate too much load on the rollers which in spite of the construction of the chute and the fact that it is vibrated, might still cause clogging. The gate 89 releases the rollers for passage down into the chute 23 its full length when the latter is moved to the left and away from the gate 89. In that way the chute 23 is loaded with rollers in between the assembling operations.

While I have herein disclosed an oscillating chute 23 in combination with a stationary inclined chute 33, it should be understood that I may employ only one of these chutes, as, for example, practical roller bearing assembling machines have been built utilizing simply a stationary inclined chute like the chute 33, the rollers being delivered directly from the lower end of this stationary chute to the assembling mechanism.

It is believed the foregoing description conveys a good understanding of the various objects and advantages of my invention, and the appended claims have been drawn with a view to covering all legitimate modifications and adaptations.

I claim:

1. A roller feeding device comprising a chute disposed so as to conduct rollers or the like by gravity from a source to a receptacle, said chute having a longitudinal passageway provided therein for said rollers having substantially parallel inner side walls at least one side wall of which is formed for broadside engagement by the rollers in planes perpendicular to the axis of the passageway at relatively close intervals in their travel through said chute to deflect the rollers substantially into parallelism.

2. A roller feeding device comprising a chute disposed so as to conduct rollers or the like by gravity from a source to a receptacle, said chute having a longitudinal passageway provided therein for said rollers having opposed inner side walls formed for broadside engagement by said rollers in planes perpendicular to the axis of the passageway so as to cause zigzag travel of the rollers, whereby to deflect the rollers into approximate parallelism, means supporting the chute at its upper inlet end for pivotal movement, and means for causing vibratory movement of said chute about said pivot to expedite the zigzag travel of the rollers therethrough.

3. A roller feeding device comprising a chute disposed so as to conduct rollers or the like by gravity from a source to a receptacle, said chute having a longitudinal passageway provided therein for said rollers having opposed inner side walls formed for broadside engagement by said rollers in planes perpendicular to the axis of the passageway so as to cause zigzag travel of the rollers, whereby to deflect the rollers into approximate parallelism, means supporting said chute for vibratory motion, and means for imparting vibratory motion to the chute whereby to accelerate the travel of the rollers therethrough.

4. A roller feed device comprising, a chamber, a chute disposed so as to conduct the rollers from a source by gravity to said chamber, said chute having a longitudinal passageway provided therein for said rollers having substantially parallel inner side walls, said side walls formed with staggered transverse projections so as to cause zigzag travel of the rollers, whereby to deflect the rollers into approximate parallelism, and means supporting said chute for vibratory motion, whereby to accelerate the travel of the rollers therethrough.

5. A roller feeding device comprising, a chute for conducting rollers or the like by gravity to a receiving means, means for delivering rollers to the chute, means in the chute serving by engagement with the rollers passing therethrough to bring the rollers substantially into parallelism, said last named means comprising transverse projections on opposite side walls of a passage provided in the chute, the projections being in staggered relationship to cause zig-zag travel of the rollers through the chute, and means for vibrating the chute in transverse relation to the projections to ensure rapid travel of the rollers by gravity through the chute.

6. In a machine of the class described, a chute for feeding rollers or the like by gravity into an assembling chamber, mounted for swinging movement above the chamber with the lower delivery end thereof over an opening provided in the wall of said chamber for discharge of rollers or the like into the chamber, means for communicating vibratory movement to the chute to aid in the passage of rollers or the like through the chute into the chamber, means adapted to serve as a closure for the delivery end of the chute in an out-of-the-way position thereof, and means for closing the opening and swinging the chute to an out-of-the-way closed position when the chamber is filled.

7. In a feed mechanism comprising a support having a discharge opening through which articles to be fed are arranged to be discharged, a downwardly projecting chute carried thereby having its upper inlet end adjacent said discharge opening, and another chute pivotally mounted adjacent the lower end of the last mentioned chute to receive articles therefrom and direct the articles to a point of discharge both of said chutes having staggered projections on their inner opposed side walls for broadside engagement by said rollers, thereby to deflect the rollers into parallelism during their fall through the chute.

8. A device as set forth in claim 7 including means for oscillating the last mentioned chute.

9. A device as set forth in claim 7 including a stop stationarily mounted with respect to the pivoted chute and having a portion projecting into said chute to cut off the discharge of articles therethrough when the chute is in one position but allowing discharging of articles therethrough when the chute is in another position.

AXEL F. REHNBERG.